United States Patent
Tout

(10) Patent No.: US 7,546,381 B2
(45) Date of Patent: *Jun. 9, 2009

(54) METHOD AND SYSTEM FOR INTERNATIONALIZING DOMAIN NAMES

(75) Inventor: Walid R. Tout, Ypsilanti, MI (US)

(73) Assignee: IDN Technologies LLC, Suffern, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/806,595

(22) Filed: Jun. 1, 2007

(65) Prior Publication Data

US 2007/0239865 A1    Oct. 11, 2007

Related U.S. Application Data

(63) Continuation of application No. 10/929,895, filed on Aug. 27, 2004, now abandoned, which is a continuation of application No. 09/723,200, filed on Nov. 27, 2000, now Pat. No. 6,829,653, which is a continuation of application No. 09/358,043, filed on Jul. 21, 1999, now Pat. No. 6,182,148.

(60) Provisional application No. 60/124,956, filed on Mar. 18, 1999.

(51) Int. Cl.
*G06F 15/16*    (2006.01)

(52) U.S. Cl. .................. 709/245; 709/246; 709/223

(58) Field of Classification Search .................. 709/245, 709/246, 223, 225, 227, 238
See application file for complete search history.

(56) References Cited

U.S. PATENT DOCUMENTS

| | | | | |
|---|---|---|---|---|
| 5,978,568 A * | 11/1999 | Abraham et al. | ............ | 709/224 |
| 6,119,171 A * | 9/2000 | Alkhatib | .............. | 709/245 |
| 6,151,631 A * | 11/2000 | Ansell et al. | ............ | 709/225 |
| 6,154,777 A * | 11/2000 | Ebrahim | ............... | 709/227 |
| 6,314,469 B1 * | 11/2001 | Tan et al. | ............... | 709/245 |
| 6,324,585 B1 * | 11/2001 | Zhang et al. | ............ | 709/245 |
| 6,332,158 B1 * | 12/2001 | Risley et al. | ............ | 709/225 |
| 6,594,254 B1 * | 7/2003 | Kelly | ............... | 370/352 |
| 6,738,827 B1 * | 5/2004 | Abir | ............... | 709/245 |
| 6,829,653 B1 * | 12/2004 | Tout | ............... | 709/245 |

OTHER PUBLICATIONS

"i-DNS—Internationalized Domain Name System," Jan. 1998, published by the Center for Internet Research (CIR), pp. 1-4.*

* cited by examiner

*Primary Examiner*—Philip B Tran
(74) *Attorney, Agent, or Firm*—Townsend and Townsend and Crew LLP

(57) ABSTRACT

A method and system for internationalizing domain names is provided which 1allows domain names to be in any language without having to modify the existing Internet domain name servers. When a domain name includes non-English characters, a domain name transformer intercepts the domain name prior to reaching the resolver. The domain name is converted to a standard format which can represent all language character sets, such as UNICODE. The UNICODE string is then transformed to be in a compliant format. Redirector information is then appended to the compliant string which identifies the delegation of authoritative root servers and/or domain name servers responsible for the domain name. The compliant domain string is then resolved by the authoritative domain name server just as any English domain name.

18 Claims, 2 Drawing Sheets

METHOD AND SYSTEM FOR INTERNATIONALIZING DOMAIN NAMES

RELATED APPLICATIONS

This application is a continuation of U.S. application Ser. No. 10/929,895, filed Aug. 27, 2004 now abandoned, which is a continuation of U.S. application Ser. No. 09/723,200 filed Nov. 27, 2000 now U.S. Pat. No. 6,829,653, which is a continuation of U.S. application Ser. No. 09/358,043 filed Jul. 21, 1999 now U.S. Pat. No. 6,182,148, which claims the benefit of U.S. Provisional Application No. 60/124,956 filed Mar. 18, 1999.

BACKGROUND OF THE INVENTION

The present invention relates to the internet arts. It finds particular application to a method and system for internationalizing internet domain names such that a non-compliant international domain name can be processed by the existing internet structure.

With the proliferation and extremely fast adoption of the Internet around the globe, the need for international capabilities on the Net has become a matter of absolute necessity. A lot of work has been done so far on the subject of localization of scripts and the internationalization (I18N) of systems. However, up to this date, the Internet has remained more associated and very tightly dependent upon the English language since the current Domain Name System (DNS) is presently restricted to the monocase 7 bit ASCII English language alphabet.

The Domain Name System is the part of the Internet infrastructure that translates human-readable domain names into the Internet Protocol (IP) numbers needed to establish TCP/IP communication over the Internet. So far, existing domain name server systems accept only domain names according to RFC1035. RFC1035 specifies the alphabet (set of allowed symbols), the syntax and all restrictions for permissible/valid domain names. Currently, only A to Z upper case, a to z lower case, the "-" and "." are permitted.

There have been proposals which suggest changing the domain name server system to accommodate I18N. While the proposed solution could work, it requires major changes to the Internet as it exists today. Domain name servers around the globe, which number in the thousands, would have to be changed or updated. In the meantime, existing domain name servers would not be able to handle the new queries sent to them by I18N-enabled domain name servers. Results of these I18N queries can vary anywhere from single rejection to a complete crash of the non-enabled domain name servers.

The present invention provides a solution to this problem in that the present invention would allow users of the Internet to use international domain names mainly in their own script or characters. The present invention works with the existing domain name servers around the world and does not require any updates to be applied to these servers nor any changes to be made to their configurations.

The present invention provides a new and unique method and system for internationalizing domain names which cures the above problems and others.

SUMMARY OF THE INVENTION

In accordance with the present invention, a method of converting an internet international domain name to an RFC1035 compliant format is provided. The international domain name includes non-English characters which are RFC1035 non-compliant. The international domain name is intercepted and transformed to an RFC1035 compliant domain name. A redirector string is appended to the compliant domain name where the redirector string directs resolution of the RFC1035 compliant domain name to a domain name server.

In accordance with a more limited aspect of the present invention, the intercepting is transparent to the user and occurs on a user's computer.

In accordance with another aspect of the present invention, a method for enabling a user device to be connected to an Internet address where a domain name request originates in a non-compliant format is provided. The non-compliant domain name request is transformed to a converted domain name in a compliant format where the transforming is transparent to a user. A redirector string is automatically appending to the transformed compliant domain name which includes information for directing the compliant domain name to a domain name server that resolves the compliant domain name such that the user device is connected to an Internet address corresponding to the compliant domain name.

In accordance with a more limited aspect of the present invention, the redirector string is automatically generated.

One advantage of the present invention is that international domain names are converted to a compliant format such that current domain name servers do not have to be modified in order to accept international domain names.

Another advantage of the present invention is that transformation of a domain name and generation of the redirector information is performed prior to being received by a domain name server.

Another advantage of the present invention is that the domain name transformation allows for a reverse look-up transformation such that an IP number can be reverse transformed to obtain its corresponding international domain name.

Still further advantages of the present invention will become apparent to those of ordinary skill in the art upon reading and understanding the following detailed description of the preferred embodiments.

BRIEF DESCRIPTION OF THE DRAWINGS

The following is a brief description of each drawing used to describe the present invention, and thus, are being presented for illustrative purposes only and should not be imitative of the scope of the present invention, wherein.

DETAILED DESCRIPTION OF THE PREFERRED EMBODIMENTS

Figure 1:
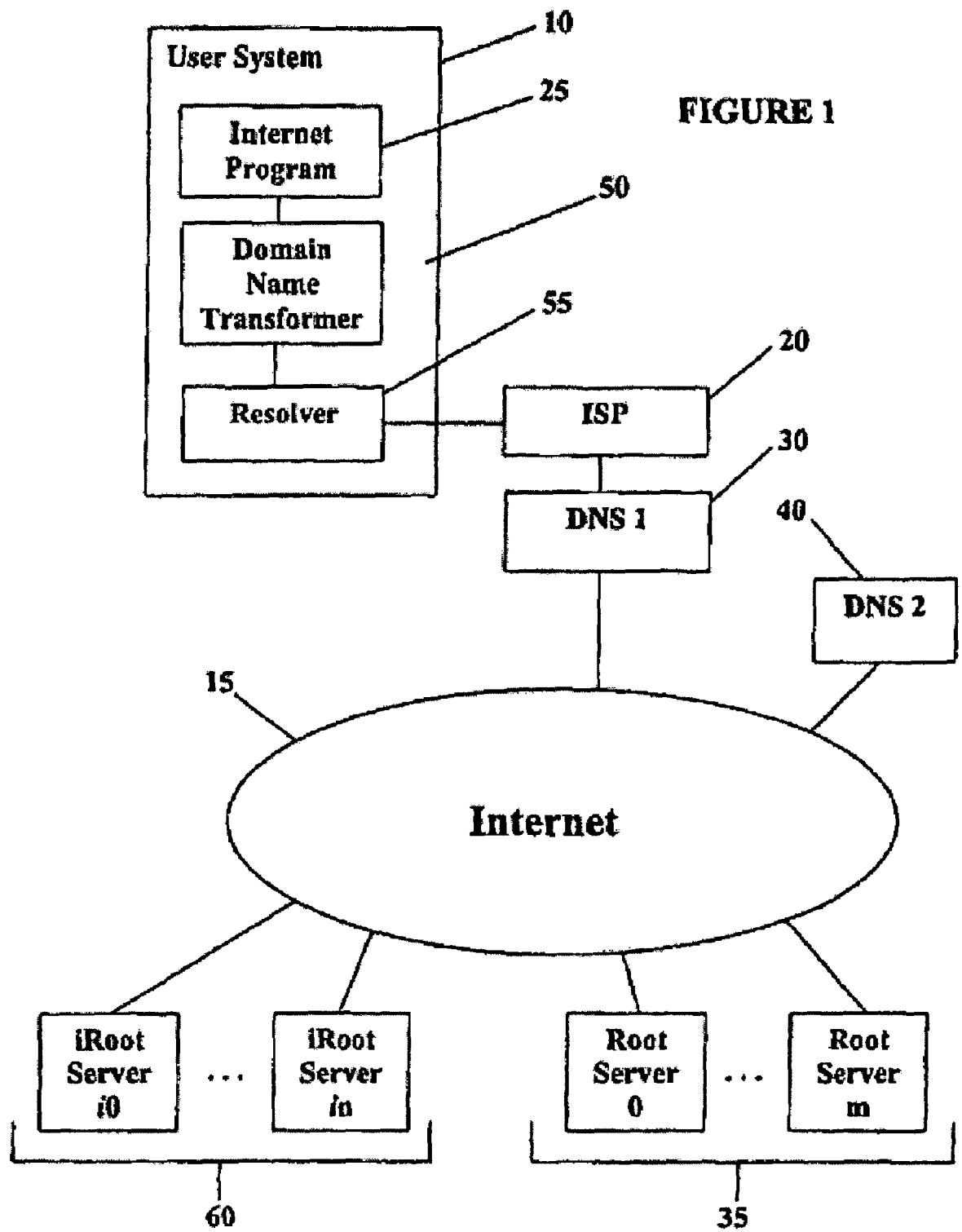
FIG. 1 illustrates an Internet and user configuration in accordance with the present invention.

With reference to FIG. 1, a user system 10 is typically connected to the Internet 15 through an Internet service provider (ISP) 20. The following description works with any Internet compliant programs such as a browser, email, ftp, telnet, gopher, news, and others as is know in the art. A browser is used here for exemplary purposes. An Internet program 25, such as a browser, runs on the user's computer and provides an interface between the user 10 and the Internet 15. The browser 25 helps the user maneuver through sites on the Internet 15 and communicate information between the user 10 and the sites. The user establishes a connection to a site by requesting a domain name of the site into the browser 25. The browser initiates resolution of the domain name which ultimately results in obtaining an Internet protocol number (hereinafter "IP number") that is an Internet address of the website or other Internet location identifier corresponding to the domain name as is known in the art.

A domain name server (DNS1) 30 is connected to the internet service provider 20 and processes domain name requests to retrieve a corresponding IP number. Currently, there are about 300,000 domain name servers throughout the world each being responsible for the domain names of a group of domains which were registered to that domain name server. Each domain name server includes a database containing registered domain names, their corresponding IP number/address, and other domain related information. If the domain name requested is unknown to the domain name server 30, it will consult a root server selected from a group of root servers 35. Currently, there are about 13 main root servers throughout the world.

Each root server 35 handles a pre-determined set of domain names based on its top level domain. For example, there are a few root servers responsible for handling all domain names with ".com" as their top level domain. Another set of root servers is responsible for all domain names having ".org" as its top level domain and so on. For each domain name registered within a root server, the root server identifies which domain name server (or another root server) is responsible for the domain name. Current root servers are configured to store a primary domain name server address and up to four back-up domain name servers which are responsible for resolving the domain name requested. The processing is then transmitted by DNS1 30 to the appropriate domain name server, for example, domain name server (DNS2) 40 which returns an IP number for the domain name requested. This resolution process many involve more intermediate DNS servers along the way but will always function in a similar manner to what was explained here. The user may then connect to the site corresponding to that IP number. Of course, once the IP number is known, any Internet connection (e.g. Telnet, ftp, etc.) can be made.

As mentioned in the background section, current domain name servers are limited to receiving domain names which are RFC1035 compliant. In other words, domain names must be in the English alphabet. The present system cures this short coming by allowing a user 10 to request a domain name that includes non-English characters (which is hereinafter called an "international domain name"). In order to avoid modifying the domain name servers to handle such a request, the international domain name is converted by the present system to an RFC1035 compliant domain name before it is received by the domain name server.

With further reference to FIG. 1, a domain name transformer 50 is installed in the user's system 10 and includes a software layer that is inserted inside the TCP/IP stack on the computer system. This layer is positioned to intercept all domain resolution calls on the user's system prior to reaching the resolver 55. In a Windows based system, if Winsock 1.x (a Windows socket layer) is operating on the user's system, the winsock.dll is shifted in the processing sequence by a new winsock.dll. The new winsock.dll is positioned before the original winsock.dll so that domain name function calls, such as GetXbyY, are intercepted. The new winsock.dll then transforms the international domain names as described below. After the transformation, the new winsock.dll passes the processing to the original winsock.dll with the transformed domain name. Other function calls directed to Winsock that are not related to domain name functions pass-through the new winsock.dll to the original winsock.dll. Another version of Winsock, Winsock 2, includes Layered Service Provider (LSP) and Name Space Provider (NSP) which are both layers. The NSP provides the GetXbyY function so that queries that have to resolve a domain name are performed by this component. In the case of Winsock 2, the present system installs a new version of the NSP which is a domain name server NSP replacing the original NSP or adds an additional NSP layer to function with the original NSP. When the new NSP receives a domain name, it applies the transformation logic of the present invention to transform an international domain name to a compliant format, and then calls the original resolver function 55 (e.g. GetXbyY, WSAGetXbyY) with the transformed name. Regardless of the user's original software, it will be appreciated that the present invention can be installed at any desired position in the processing sequence on the user's machine such that an international domain name is intercepted/obtained, and transformed before it reaches a domain name server (e.g. between the origination of the domain name and the resolving of the domain name).

With the present transformation software in place, when the user requests an international domain name, the domain name transformer 50 intercepts the request and converts the international domain name to an RFC1035 compliant format. The transformation is performed transparent to the user and to the other components of the system so that additional modifications to the system are not required. Once the international domain name is transformed to a proper format, it is then passed to the resolver 55 which completes the domain resolution call function. The resolver 55 communicates to the domain name server 30 where the domain name is resolved as usual. Thus, the current domain name servers are unaware of the transformation and do not have to be modified in order to process an international domain name. The present invention, using redirector information, allows an existing domain name server to resolve an international domain name in the same manner as domain names are currently resolved.

Figure 2:
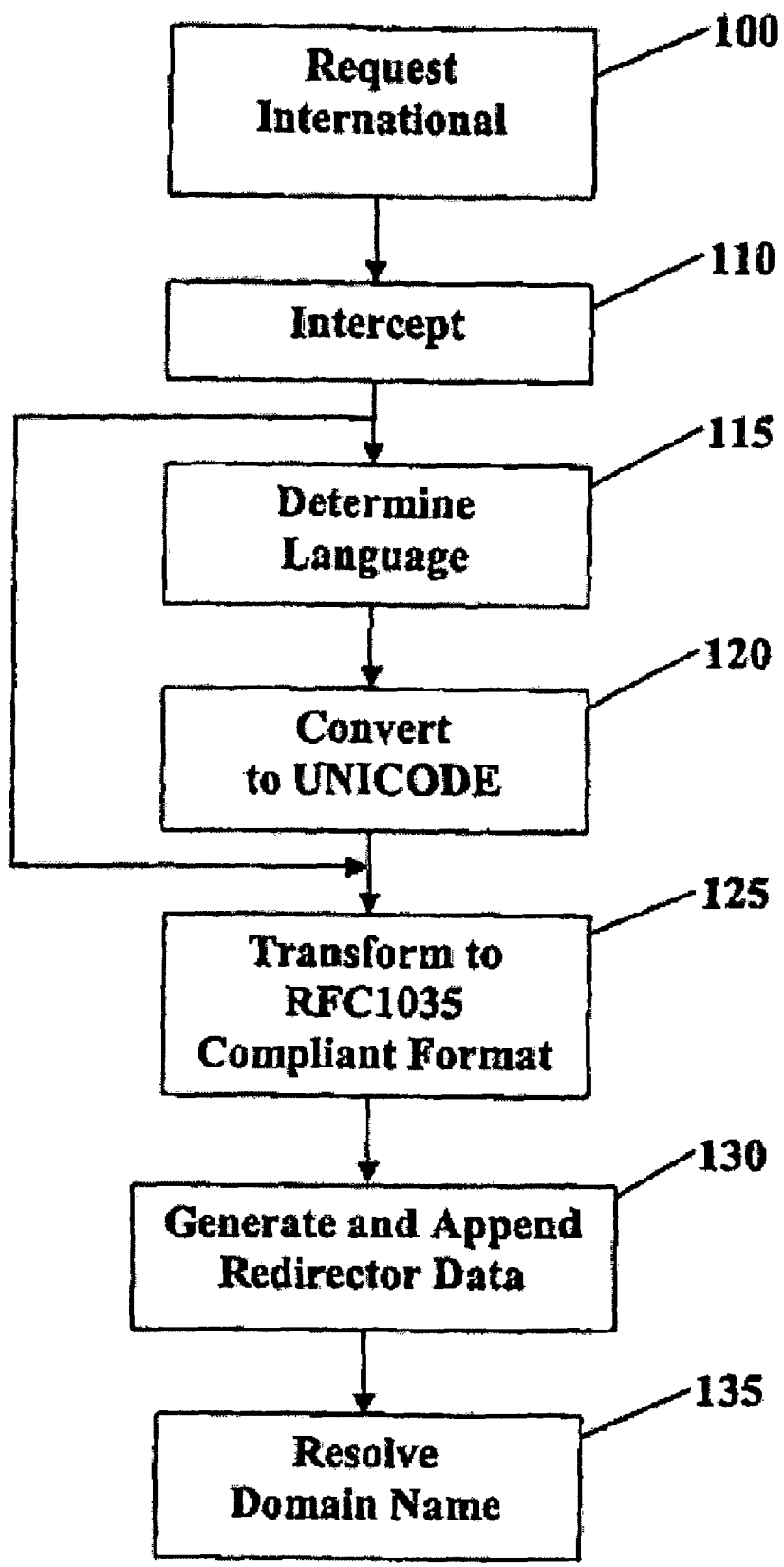
FIG. 2 illustrates the domain name transformation process in accordance with the present invention.

With reference to FIG. 2, the transformation process is shown. When an international domain name is requested 100, the domain name is intercepted 110 before it reaches the system's domain name resolver 55. In other words, the domain name is obtained by the present system whether it is entered by the user, activated from a hyperlink, or obtained in any other manner as is known in the art. The domain name is traversed to determine if any character exists which is not RFC1035 compliant. If any such character exists, then the domain name is considered to be an international domain name. Depending on the user's version of software, UNICODE is either supported or not. If UNICODE is not supported, the present system performs the additional steps of determining the language 115 of the international domain name and then converting 120 the international domain name to its corresponding UNICODE string. The language of the domain name is determined from the active code page ID from the user's system. The code page ID identifies what language the domain name is in and, thus, identifies its character set. By knowing the character set, the international domain name is converted to its UNICODE string as is known in the art. If, however, the user's system supports UNICODE, these previous two steps are skipped because the domain name will already be put in UNICODE format by the system. The UNICODE string is then transformed 125 to an RFC1035 compliant format which is described as follows.

The current domain name protocol RFC1035 includes only 37 characters. Using binary format, at least 5-bits are required to represent 37 values. UNICODE, however, is a 16-bit format. Thus, the 16-bit format of the UNICODE string is transformed to a 5-bit format that is RFC1035 compliant. This transformation, called UTF-5, is described in the memorandum "Internationalization Of Domain Names," by H. Duerst, Jul. 1998 which is incorporated herein by reference.

Several encodings for the Universal Character Set (UCS), so called UCS Transform Formats (UTF), exist already, namely UTF-8 [RFC2044], UTF-7 [RFC1642], and UTF-16 [UNICODE]. Unfortunately, none of them is suitable for the present transformation from 16-bits to 5-bits. Therefore, UTF-5 is defined to perform this encoding using the following principles:

To accommodate the slanted probability distribution of characters in UCS4 (Universal Character Set four bytes long), a variable-length encoding is used.

Each target letter encodes 5 bits of information. Four bits of information encode character data, the fifth bit is used to indicate continuation of the variable-length encoding.

Continuation is indicated by distinguishing the initial letter from the subsequent letter.

Leading four-bit groups of binary value 0000 of UCS4 characters are discarded, except for the last two groups (i.e. the last octet). This means that looking at the UNICODE layout map of languages, ASCII and Latin-1 characters need two target letters, the main alphabets up to and including Tibetan need three target letters, the rest of the characters in the BMP need four target letters, all except the last (private) plane in the UTF-16/Surrogates area [UNICODE] need five target letters, and so on.

The letters representing the various bit groups in the various positions are chosen according to the following table:

| Nibble Hex | Value Binary | Initial |
|---|---|---|
| 0 | 0000 G | 0 |
| 1 | 0001 H | 1 |
| 2 | 0010 I | 2 |
| 3 | 0011 J | 3 |
| 4 | 0100 K | 4 |
| 5 | 0101 L | 5 |
| 6 | 0110 M | 6 |
| 7 | 0111 N | 7 |
| 8 | 1000 O | 8 |

| Nibble Hex | Value Binary | Initial |
|---|---|---|
| 9 | 1001 P | 9 |
| A | 1010 Q | A |
| B | 1011 R | B |
| C | 1100 S | C |
| D | 1101 T | D |
| E | 1110 U | E |
| F | 1111 V | F |

As an example, suppose a current domain is "is.s.u-tokyo.acjp" with the components standing for information science (is), science (s), the University of Tokyo (u-tokyo), academic (ac), and Japan Op). This might be represented by "JOUHOU.RI.TOUDAI.GAKU.NIHON" (a transliteration of the kanji that might probably be chosen to represent the same domain). Writing each character in U+HHHH notation as in UNICODE (represented by a "U+" and four hexidecimal digits HHHH), this results in the following:

U+60c5U+5831.U+7406.U+6771U+5927.U+5b66.U+65e5U+672c

This UNICODE string is given for reference only. It is not the actual encoding or something being typed in by the user. The UNICODE string is then transformed to RFC1035 compliant format according to UTF-5 before submitting it to the domain name server resolver. The UNICODE string becomes:

M0C5L831.N406.M771L927.LB66.M5E5M72C

Using the above table, it is seen that the HHHH component "60c5" is transformed to "M0C5"since "6" is encoded to "M." The "5831" becomes "L831" and so on.

Of course, the transformations of the present invention are dependent on the current protocols and standards. Thus, if the protocols are changed such that different character sets are used, the transformation would change to adopt the new protocols. It will be appreciated that if RFC1035 is no longer the complaint standard for domain names, the present invention can be easily modified such that the transformation converts the international domain names to the new domain name standard format.

The following is an another example that illustrates the present translation process:

| | |
|---|---|
| صفحة وليد | Domain name as it appears on the screen as typed by user in Arabic. |
| d5 dd cd c9 dc e6 e1 ed cf | Corresponding system character code representation Code Page ID as returned by system is charsetl256 (Arabic). The corresponding UNICODE Range 0x0600-0x06ff |
| 0635 0641 062d 0629 0640 0648 0644 064a 062f | Translation of character codes into the corresponding UNICODE codes |
| M35M41M2dM29M40M48M44M4aM2f | Apply the restricted mapping from UNICODE to a RFC1035 compliant name (using the UDM—United Data Mapper) |
| ar.il8n.net | Use UDM to determine the redirector information including an iroot server set based on the UNICODE range; Select the candidate iroot server from the returned set |
| M35M41M2dM29M40M48M44M4aM2f.ar.il8n.net | Construct the final domain name by appending the redirector information to the RFC1035 compliant domain name obtained above Pass the final domain name to the TCP/IP layer below to perform name resolution per the normal operation. |

With further reference to FIG. 2, after the above transformation, the international domain name is in RFC1035 compliant format. The string "ar.i18n.net" is redirector information 130 that is appended to the converted string and functions like a top level domain, and identifies the authoritative domain name server responsible for the current domain name. Once the redirector information is appended to the domain name, the domain name becomes a fully qualified domain name (FQDN). A fully qualified domain name includes at least a top level domain and a secondary domain which is enough information to resolve the domain name. As explained previously, the domain name server 30 resolves a domain name by inquiring the root server 35 (the root server responsible for the top level domain found in the domain name) about which domain name servers are authoritative domain name servers for the given domain name. The responsibility of top level domains such as, ".com", ".net", ".org", ".edu", etc., is assigned to a pre-selected set of root servers. Thus, the inquiry for a domain name such as-"abc.net" would be directed to one of the root servers in the root server set responsible for ".net" domains.

The above redirector information "ar.i18n.net" provides the following exemplary delegation instructions for resolving the international domain name. Of course, any identifiers can be used to represent a domain set. The "i18n" identifies the domain name as "international" and the "ar" further identifies it as being in Arabic which is determined from the UNICODE range of the domain name characters. The domain resolution is explained as follows. The transformed compliant domain name including the redirector information is received by the domain name server 30 where it is attempted to be resolved. The domain name server 30 identifies the top level domain ".net" for which it is not an authoritative DNS. As such, the domain name server consults an authoritative root server which is responsible for .net domains, for example, root server m from the root server group 35. Examining the second level domain "i18n", root server m determines from its database that the authoritative domain name server for this domain is, for example, DNS2 40. DNS1 30 then communicates the entire domain to DNS2 40. DNS2 40 first determines whether it is authoritative and delegated for this domain by scanning its database of registered domains. In this case, DNS2 40 determines from the redirector information that the delegated server for "ar.i18n.net" (Arabic domains) is the iroot server i3 from iroot server group 60. The resolution continues in the predescribed manner until the authoritative DNS for the current domain is determined which returns the IP number of the domain name. The foregoing example assumes that the domain "i18n.net" and sub-domain "ar.i18.net" were properly pre-assigned and registered to the appropriate root servers and domain name servers.

The redirector information controls the delegation path for resolving the domain name. The redirector information can be a single unique top level domain which identifies an international root server (iroot server) or may include multiple levels of identifiers such as "ar.i8n.net". As shown in FIG. 1, a group of iroot servers 60 are connected to the Internet. For exemplary purposes, the iroot servers are identified as i0, i1, . . . in. Of course, any type of identifiers can be used to name the root servers. Each iroot server 60 is configured to function in the same manner as any other root server 35 which handle English domain names.

Another example of using the redirector information would include appending ".i3" to the converted domain name string. To generate the redirector information, the system determines which iroot server is responsible for the domain name. For this purpose, the UNICODE string is examined using a Unified Domain Mapper (UDM). The character values of the UNICODE string will belong to a specific character range. The character range in turn identifies the character set/language of the international domain name (e.g. Arabic, Japanese, etc.) Thus, if it is determined that the international domain name was entered in Arabic, the system selects the iroot server which is responsible for Arabic domain names (e.g. "i3") and ".i3" becomes the top level domain. The domain name server 30 then knows to direct the domain name request to the proper iroot server to query for the user's specified domain/host based on the redirector information, in this case, iroot server i3. Alternately, the redirector information may be generated from a predetermined string that covers all or a sub-set of the international domains. For example, ".i" can represent all international domains, ".ap" can represent a sub-set "Asia pacific", ".ar" can represent a sub-set "Arabic" or any other predetermined identifiers. The redirector can be any of the current top level domains such as .com, net, .org, etc. such that current root servers resolve the request. This predetermined redirector can be appended to the transformed domain name by the software. Of course, any predetermined string can be used to identify an international domain and identify a responsible server. Alternately, the user or internet program can supply the redirector information along with the domain name, thus generating the redirector information. In this way, the user or program adds a ".i" to a domain name which identifies it as international.

With further reference to FIG. 2, after the transformation, the RFC1035 compliant domain name includes the transformed domain name and the appended redirector information which makes it a fully qualified domain name. The compliant domain name is sent to the resolver where it is resolved 135 according to the resolver functions as described above. The resolver function communicates with the domain name server 30 and the process continues until the proper IP number corresponding to the original domain name is returned.

With the present invention, the international domain name transformation allows for the reverse look-up of domain names from their corresponding IP number. Each domain name server contains a data base of registered domain names and their corresponding IP number. Given an IP number, the domain name can be retrieved. This name, of course, is an RFC1035 compliant name which can be converted back to a UNICODE formatted string. The UNICODE string can then be translated back to its original character set in the original international language.

The present system also provides for dynamic modification of its software. When root servers are re-assigned or new root servers added, the redirector information must reflect these changes so that international domain names are properly resolved. The present system includes a periodic look-up function which periodically looks to root servers or other predefined locations on the internet to determine if changes have been made. If changes are made, modified software (such as a new UDM mapper) is provided automatically to the user system. In this manner, the present invention modifies and updates itself.

The present invention is transparent to the existing infrastructure of the Internet and is totally hidden in operation from both ends of the communication path, namely, the user 10 and the domain name server 30. With the present invention, users are not required to add or change any configuration information on their computer systems. Users can keep the same Internet Service Provider 20, the same computer system and the same network configuration. All that is required is to install the present system in the user's computer system 10 as described above. Once the present system is installed, the user can start using international domain names immediately. The Internet Service Provider (ISP) and the Domain Name Servers (DNS) do not have to change their present configurations.

The invention has been described with reference to the preferred embodiment. Obviously, modifications and alterations to others upon a reading and understanding of this specification. It is intended to include all such modifications and alterations insofar as they come within the scope of the appended claims are the equivalence thereof.

I claim:

1. A method comprising:
receiving an international domain name, the international domain name having a format that is noncompliant with a name resolver format;
translating system character code representation of the international domain name to a generalized representation of the international domain name;
applying a restricted mapping to the generalized representation of the international domain name to create a compliant domain name;
identifying a root server from the generalized representation of the international domain name;
automatically appending redirector information associated with the root server to the compliant domain name to create a fully-qualified domain name (FQDN); and
passing the FQDN to a name resolver.

2. The method of claim 1, further comprising identifying the language in which the international domain name was received.

3. The method of claim 2; wherein identifying the root server comprises selecting a root server from a plurality of root servers, the selected root server being assigned to the identified language.

4. The method of claim 1, wherein the generalized representation is a UNICODE representation.

5. The method of claim 1, wherein the root server is associated with at least one of a language and a non-ASCII character set.

6. The method of claim 1, wherein the root server is selected from a group of root servers associated with a range of generalized representations of international domain names.

7. The method of claim 6, where the group of root servers is associated with a range of UNICODE representations of international domain names.

8. The method of claim 1, wherein at least one of applying a restricted mapping and identifying a root server is performed using a Unified Domain Mapper (UDM).

9. The method of claim 1, wherein the steps of translating, applying, identifying and appending are performed on a computer being operated by a user, the user inputting the international domain name on the computer.

10. A computer-readable storage medium storing instructions which, when executed by a processor, cause the processor to perform a method comprising:
receiving an international domain name, the international domain name having a format that is noncompliant with a name resolver format;
translating a system character code representation of the international domain name to a generalized representation of the international domain name;
applying a restricted mapping to the generalized representation of the international domain name to create a compliant domain name;
identifying a root server from the generalized representation of the international domain name;
automatically appending redirector information associated with the root server to the compliant domain name to create a fully-qualified domain name (FQDN); and
passing the FQDN to a name resolver.

11. The computer-readable storage medium of claim 10, the method further comprising identifying the language in which the international domain name was received.

12. The method of claim 11, wherein identifying the root server comprises selecting a root server from a plurality of root servers, the selected root server being assigned to the identified language.

13. The computer-readable storage medium of claim 10, wherein the generalized representation is a UNICODE representation.

14. The computer-readable storage medium of claim 10, wherein the root server is associated with at least one of a language and a non-ASCII character set.

15. The computer-readable storage medium of claim 10, wherein the root server is selected from a group of root servers associated with a range of generalized representations of international domain names.

16. The computer-readable storage medium of claim 15, where the group of root servers is associated with a range of UNICODE representations of international domain names.

17. The computer-readable storage medium of claim 10, wherein at least one of applying a restricted mapping and identifying a root server is performed using a Unified Domain Mapper (UDM).

18. The computer-readable storage medium of claim 10, wherein the steps of translating, applying, identifying and appending are performed on a computer being operated by a user, the user inputting the international domain name on the computer.

* * * * *